E. B. DE LA MATYR.
DOUBLE ACTING DIAPHRAGM ROTARY GAS METER.
APPLICATION FILED JUNE 3, 1916. RENEWED JUNE 13, 1918.
1,273,042.
Patented July 16, 1918.
3 SHEETS—SHEET 2.
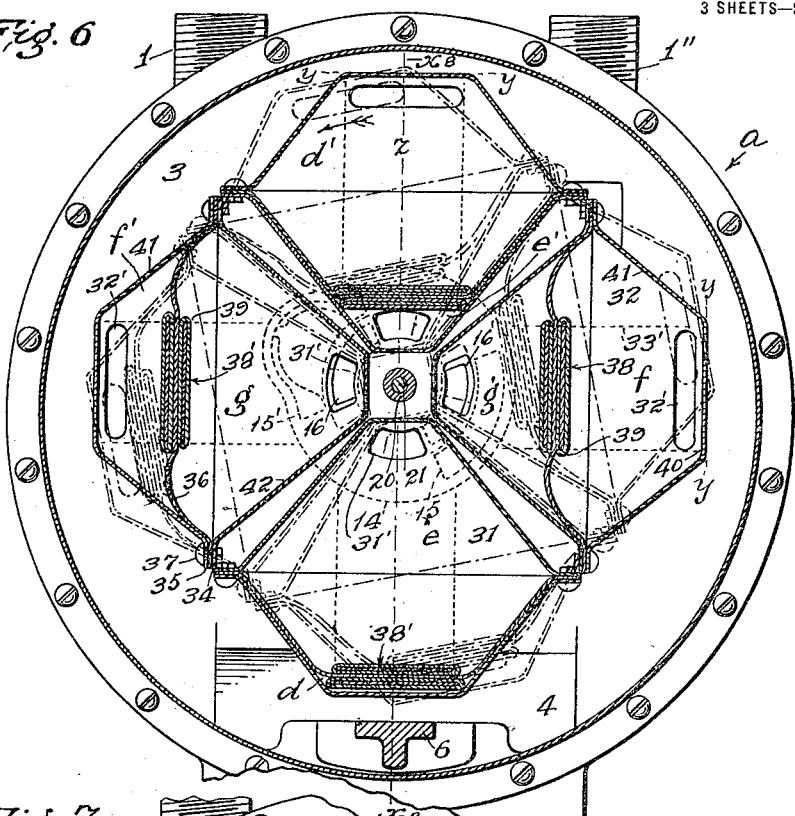
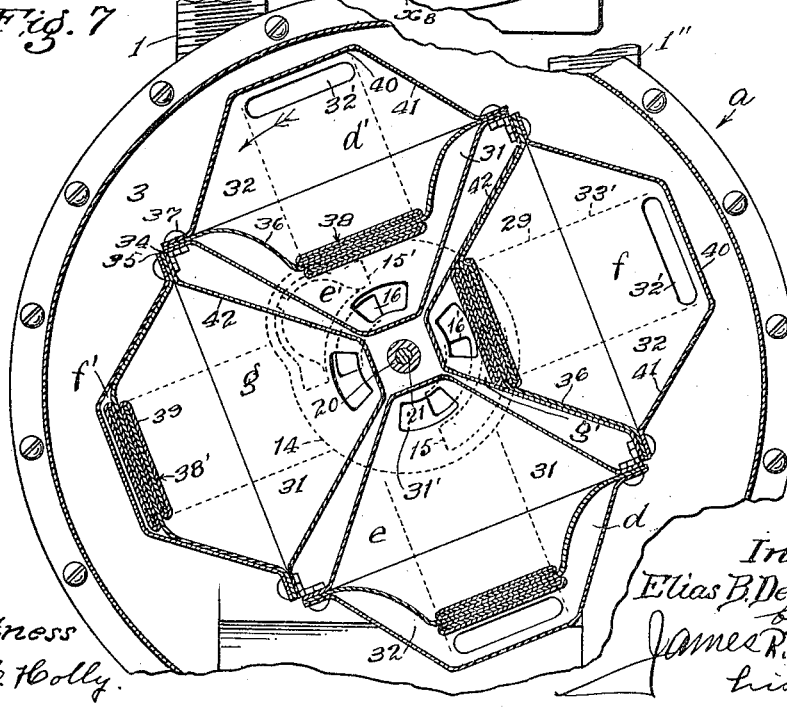
Witness
C. C. Holly.
Inventor
Elias B. De La Matyr
by James R. Townsend
his Atty.

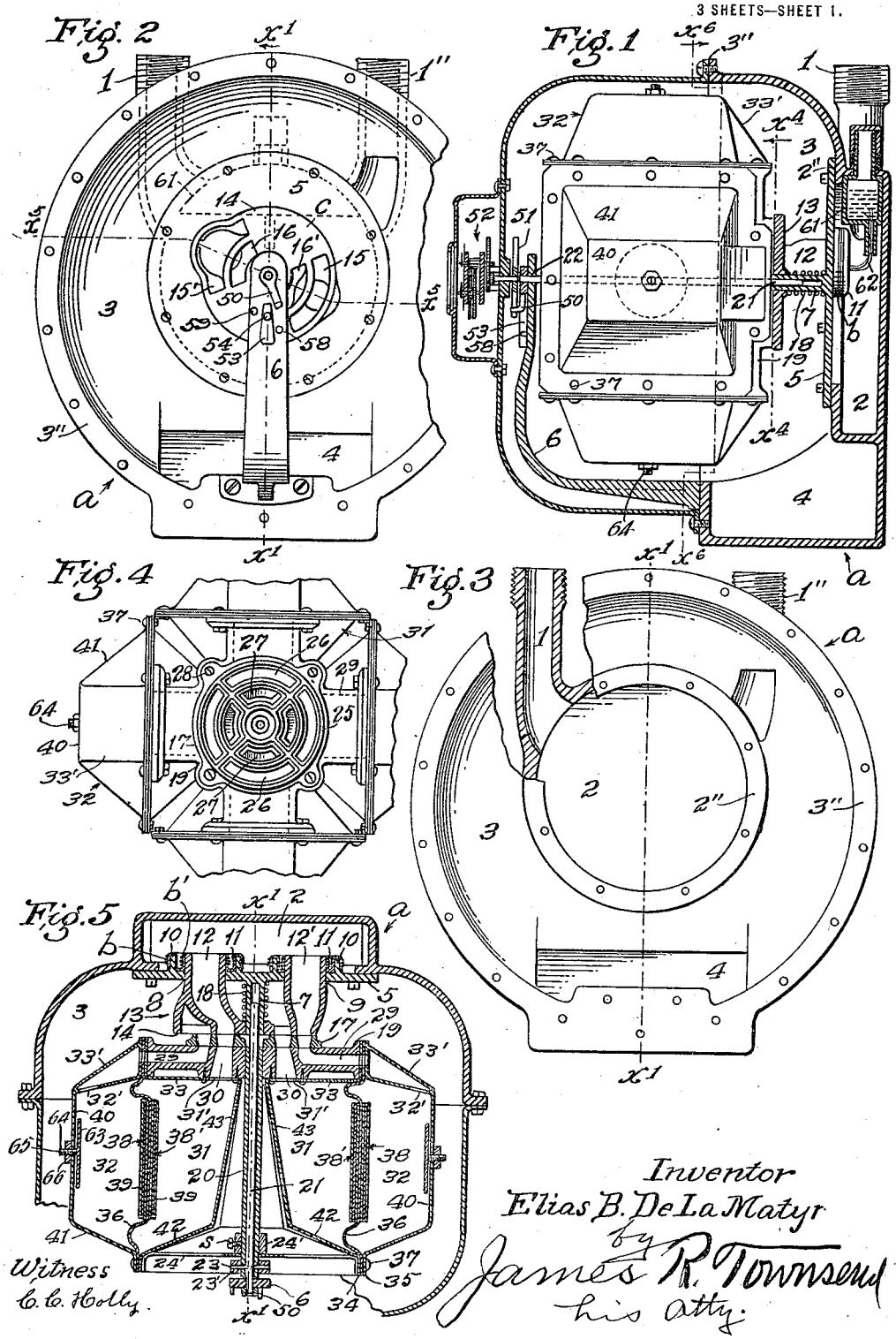

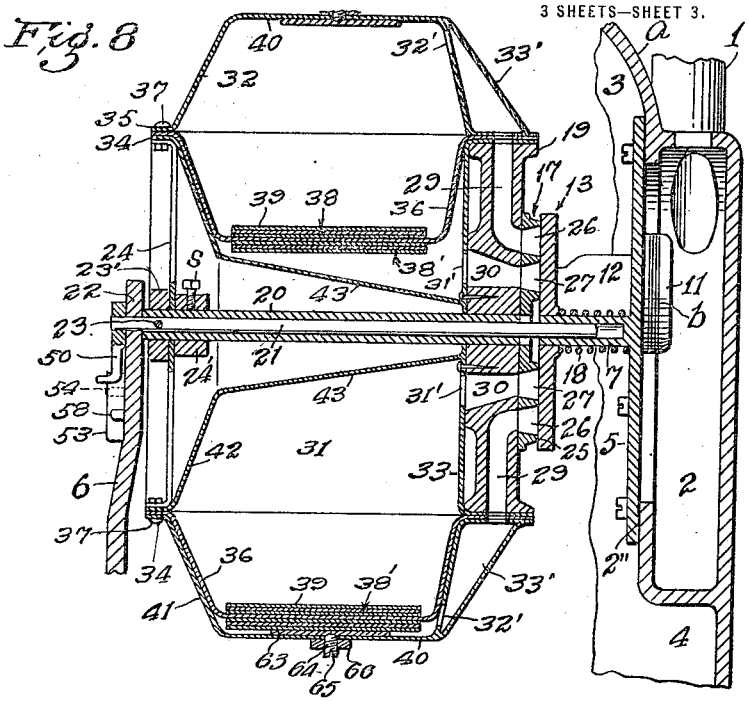

UNITED STATES PATENT OFFICE.

ELIAS B. DE LA MATYR, OF LOS ANGELES, CALIFORNIA.

DOUBLE-ACTING-DIAPHRAGM ROTARY GAS-METER.

1,273,042.   Specification of Letters Patent.   Patented July 16, 1918.

Application filed June 3, 1916, Serial No. 101,626.  Renewed June 13, 1918.  Serial No. 240,072.

*To all whom it may concern:*

Be it known that I, ELIAS B. DE LA MATYR, a citizen of the United States, residing at Los Angeles, in the county of Los Angeles and State of California, have invented a new and useful Double-Acting-Diaphragm Rotary Gas-Meter, of which the following is a specification.

This invention is an improvement over the gas meter patented to me March 17, 1914, No. 1,090,780.

Objects of the invention are:—to produce a gas meter of maximum accuracy; to produce a gas meter that will require no adjustment; that will require no flag wire or any connection to arbitrarily control one diaphragm by another; to provide a meter that will operate with minimum gas pressure; that is smooth in action, thus avoiding fluctuations of pressure at the cock and consequent flickering of lights; that insulates the measuring elements from the case by a chamber of measured gas, so that such condensation as may occur will not cause any liquid or other deposits within the measuring elements of the meter; to utilize the force of gravity for directly operating the meter; to secure simplicity of construction so that a workman having sufficient skill to set a gas meter can disassemble and assemble the meter without likelihood of impairing its action; to increase the capacity to twice that of the same size gas meter of previous construction; to give an accurate measure at any pressure, high or low; to provide metallic or other rigid compartments that will be as definite and unchanging as standard fluid measure; to do away with the necessity of regulation after leaving the factory; to prevent condensation in the measures, on the valve, or on the diaphragms; to collect all condensation in the case outside the measuring drum; to invariably and accurately measure and index all the gas before it has passed into the case or holder; to avoid the use of any stuffing-box; and to avoid the use of any gear of any kind inside the meter case.

A further object is to construct a gas meter capable of automatically oiling the diaphragms, thus to counteract the drying out action of natural gas upon the diaphragms of the meter.

An object is to prevent diaphragm shrinkage from making the meter run fast, that is to say, from registering more gas than is consumed. This is effected by providing measuring chambers or pans on both sides of each diaphragm and providing means to stop the diaphragm plate before the diaphragm is fully expanded, thus allowing the diaphragm to have sufficient slack to avoid the occurrence of any variation in the size of the chamber irrespective of any contraction of the diaphragm likely to occur. This is effected by allowing the diaphragm plate to rest on the bottom or sides of the outer pan and on the sides of the inner pan at the close of the respective or reverse movements of the diaphragm, so that the space to be filled and emptied on each side of any diaphragm remains constant irrespective of any stretching or contraction of the diaphragm that might occur.

In this connection provision is made for cushioning the diaphragm plates to prevent wearing of the diaphragm and any noise of contact.

An object is to increase the life of the diaphragm and to avoid wearing, stretching, breaking or cracking of the diaphragm. This latter advantage is gained very largely by preventing the occurrence of any condensation inside the measuring drum and by stopping the diaphragm by the pan in both directions.

The invention is considered as broadly new and pioneer in many features, some of which may be enumerated as follows:

A diaphragm mounted between two measuring chambers and oscillating to simultaneously collapse one and expand the other, and vice versa; said chamber being provided with means for admitting and emitting gas at the alternate movements of the diaphragm; the arrangement by which the weights on the diaphragms alternately counterbalance and overbalance each other to effect operation of the meter by rotating the drum in one direction; to provide for admitting and emitting gas from the measuring chambers in such a way as to allow gravity acting through the weights to turn a valve member to give effective direction to the measuring drum; the arrangement of an unmeasured gas supply chamber and a measured gas supply chamber with a measuring drum mounted in the measured gas supply chamber and a plurality of intakes from passage-ways between the supply chamber and the drum for unmeasured gas to enter the drum, a plurality of outlets from passage-ways from the drum, and valve means operable by the rotation of the drum to connect the passage-ways to and from the measuring chambers alternately with the supply passages and the measured gas chamber as the drum revolves, so that the flow of gas to the drum and the flow of gas from the drum may be constant to supply any constant demand within the capacity of the meter.

A distinctive and broadly new feature is the arrangement of ports whereby in one position ports on opposite sides of one diaphragm simultaneously receive and discharge respectively, and in another position simultaneously discharge and receive, respectively.

Other objects, advantages and features of novelty may appear from the accompanying drawings, the subjoined detail description and the appended claims. I regard the invention as broadly new and pioneer and do not limit myself to specific features of construction or combinations, but shall illustrate and describe the invention as embodied in that form which I at present deem most desirable.

Although this new meter is so constructed that the amount passing through the meter at each cycle will be invariable and is predetermined by the manufacturer, the invention makes provision of means whereby the capacity of the measuring drum may be increased or diminished for adjusting the amount of gas that will pass through the meter at each revolution and at a certain fraction of a revolution of the drum.

The accompanying drawings illustrate the invention.

Figure 1 is an elevation of a meter constructed in accordance with this invention, the case being shown in vertical section on line $x^1$, Figs. 2, 3 and 5, in the plane of the axis of the drum. Said drum is shown intact. The outlet pipe is not shown, being cut away by the plane of section.

Fig. 2 is a broken elevation from the left of Fig. 1 omitting the cover and the drum.

Fig. 3 is a fragmental elevation from the left of Fig. 1 omitting the cover and all the internal mechanism, showing the hollow base partly broken away to expose the inlet pipe which is shown in axial section.

Fig. 4 is a fragmental elevation of the inlet end of the rotary drum; looking left from line $x^4$, Fig. 1.

Fig. 5 is a broken plan section of the meter on irregular line indicated at $x^5$, Fig. 2.

Fig. 6 is an enlarged section of the meter in a plane at right angles to the axis of the drum showing the parts in position for filling two and emptying two measuring chambers while the other chambers are inactive. The diaphragms are shown as having reached the overbalancing positions for turning the meter in the direction of the feathered curved arrows. A further position of the drum is indicated in dash lines.

Fig. 7 is a view analogous to Fig. 6 showing the drum in a further position.

Fig. 8 is a fragmental section on line $x^8$, Fig. 6.

Fig. 9 is a view on an enlarged scale showing the exit faces of the rotary valve member and the adjustable non-rotary valve member.

Fig. 10 is an elevation on the scale of Fig. 9 showing the exit and contact face of the adjustable non-rotary valve member.

The base section $a$ of the case may be made of any suitable material and is shown as made of cast-metal. It is provided with an inlet pipe 1 and inlet chamber 2, and with a measured gas cavity 3, which is provided with a condensation pump 4 and an outlet pipe 1″.

The chamber 2 and the cavity 3 open onwardly from the inlet pipe 1 toward the outlet pipe 1″ and are provided at their rims with annular seats 2″ and 3″.

Journal bearing supports 5, 6 are connected to the base by any suitable means. The journal-bearing support 5 is shown as a plate that fits gas tight on and is fastened to the annular rim or seat 2″ which is formed integral with the base $a$. Said plate 5 carries the drum-spindle bearing 7 and constitutes the exit wall of the intake chamber 2. Said plate 5 forms a detachable exit partition between the chamber 2 and cavity 3. Partition plate 5 is provided with measured gas orifices 8, 9 around which are provided collars 10 on the intake ends of which annular flexible leather membranes 11 are applied and connected by suitable means as by bands $b$. The inner edges of said annular membranes 11 are connected by suitable means as bands $b'$ to intake pipes 12, 12′ that project through the plate 5 into the inlet chamber 2 and form exits for un-measured gas from said inlet chamber.

Said pipes 12, 12′ are provided at their outer ends with an adjustable non-rotary valve member 13 integral therewith and having a face plate 14 that is integral therewith and is provided with outer and inner sets of ports, there being a set of measure filling ports 15, 16 opening inward from pipes 12, 12′ and also a set of measure emptying ports 15′, 16′.

The outer ports 15 and 15′ are co-equally spaced from the axis of the bearing 7 and the inner ports 16, 16′ are co-equally distant a less space from said axis. The outer ports 15, 15′ are practically equal sectors diametrically opposite each other and the inner 16, 16′ are likewise practically equal sectors of shorter radius, the inner measure-emptying port 16′ being between the outer filling port 15 and the axis of the bearing 7, while the inner filling port 16 is between the outer emptying port 15' and the axis of the bearing 7.

The contact face $c$ of the plate 14 is flat to make a gas-tight fit with a rotary valve member 17.

The adjustable non-rotary valve member 13 is held from rotation by pipes 12, 12' in the orifices 8, 9. The bearing 7 is tubular and a spring 18 is coiled therearound and acts between the plate 5 and the non-rotary adjustable valve member 13 to yieldingly press the same away from the partition plate 5.

Said spring 18 is preferably made of such length that while capable of moving the valve plate it will not withdraw the pipes 12 and 12' from the support 5. Said pipes 12 and 12' are straight where they pass through the orifices 8, 9 of the partition plate 5, so that said straight portions may be worked freely with a to-and-fro motion through the plate 5.

The annular membranes 11 fastened to said pipes and to their respective annular bosses permit said to-and-fro motion to occur without allowing gas leakage.

The rotary valve member 17 is fixed on a ported hub member 19 that is provided with a sleeve 20 which is mounted on a spindle 21 that is a straight rod of steel or other suitable material rotatable in journal bearing 7 of plate 5 and journal bearing 22 of support 6. Said sleeve 20 and spindle 21 are fixed together by pin 23 that extends through a collar 23' that secures the end brace member 24 of the drum frame in place against a set collar 24' fixed on the sleeve 20 by a set screw $s$.

The intake end of the measuring drum is formed by the rotary valve member 17 and the hub member 19 on which it is fixed. Valve member 17 is provided with a flat face 25 that fits against the flat face $c$ of plate 14 of the adjustable non-rotary valve member. These two face plates 25 and 14 are ground to fit each other to form a joint sufficiently gas-tight to resist any pressure to which they may be subjected in the operation of the meter.

The rotary valve plate 17 is provided with oppositely-arranged pairs of ports, there being an outer port 26 and an inner port 27 in each pair, and there being a greater number of pairs of rotary valve ports 26, 27 than there are of sets 15, 16 and 15', 16' of ports in the adjustable non-rotary valve member. In the construction shown there are twice as many pairs of rotary valve ports 26, 27 as there are sets of stationary valve ports 15, 16 and 15', 16'. The outer rotary valve ports 26 are adapted to respectively register successively with the outer ports 15, 15' of the non-rotary valve member 13 and the inner ports 27 of the rotary valve member are adapted to respectively register successively with the inner ports 16, 16' of the non-rotary valve member.

The rotary valve plate 17 is fixed by screws 28 to the ported hub member 19 of the drum. Said ported hub member has outer and inner passages 29, 30, forming continuations of the outer and inner ports 26, 27, respectively.

The drum is provided with diametrically opposite pairs of pans 31, 32 secured to the hub member 19 and the end member 24 by any suitable means as by sweating, soldering, brazing or electric-welding, or by screws or other fasteners. These pans may be made of any suitable material and the inner pans 31 are provided with plane faces 33 at one end, said ends being in a common plane and fixed to the hub member 19. The inner pan of each pair communicates with a passage 30, and the outer pan of each pair communicates with a passage 29. For this purpose ports 31' and 32' are provided in one end of the inner and outer pans, and channel pieces 33' are provided on the outer pans to form a continuation of the outer passages 29 to complete communication with the outer ports 32'.

The pans of each pair are fastened together at their rims 34, 35 between which are interposed the edges of highly flexible independently-acting, circumferentially-disposed, weighted diaphragms 36, the edges of which are firmly clamped gas-tight between the pans by means of bolts 37. The outer pans are readily removable by simply removing the bolts, thus giving access to the diaphragms and making them also easily removed. Said diaphragms are provided with metal center plates 38, 38' which constitute weights that are movable toward and from the axis of the drum with the flexing of the diaphragms. Each diaphragm and its weight is adapted to oscillate from pan to pan and the pans and diaphragms of each pair constitute two reciprocal measuring chambers, one of which expands as the other contracts when the diaphragm oscillates, the rotation of the drum being controlled by the shifting of the weighted diaphragms.

The weight plates 38, 38' are padded by leather covers 39 that are adapted to come to rest against the pans at the extremes of the diaphragm movements. The outer pans are provided with bottom walls 40 formed as the chords of arcs $y$, $y$ of a common radius $z$, and the outer padded diaphragm plates 38 are adapted to rest flat against said flat outer walls at the end of the outer movement of the diaphragm, when the diaphragm side walls fit against the side walls 41 of said outer pans. At the close of the inner movement, the inner diaphragm plates 38' are arranged to contact with the sloping side walls 42 of the inner pan leaving a sloping channel 43 free at the bottom of the inner pan.

It is thus seen that at one position of the drum, one of the inner ports 30 of the drum will communicate with a supply pipe 12 and the other of said inner ports will communicate with the gas outlet 1'', while at the time the outer and inner ports which are companions to said inner and outer ports, will communicate with a supply pipe 12' and with the outlet pipe 1'' respectively. That is to say, the ports are so arranged that diametrically opposite diaphragms will operate simultaneously in the same direction so that one will approach the axis while the other recedes from it, and vice versa.

By reference to Fig. 6 it will be seen that at one possible position of the drum in which upper and lower diaphragms are vertically disposed relative to each other and the other two diaphragms are horizontally disposed relative to each other, the upper and lower diaphragms may be fully depressed, so that the outer chamber $d'$ on the upper side of the drum, and the inner chamber $e$ of the lower side of the drum will be expanded, while the inner chamber $e'$ on the upper side and the outer chamber $d$ on the lower side are entirely deflated; and at the same time the horizontal chambers $f$, $f'$, $g$, $g'$ are subject to change of form as the gas under pressure from the inlet chamber passes through the meter so long as the outlet is open. In this Fig. 6 the outer chamber $f$ and the inner chamber $g$ are in process of inflation, while the inner chamber $g'$ and the outer chamber $f'$ are in process of deflation. The gas entering $f$ through the outer port 32' forces the weights or diaphragm plates 38 toward the left, supplying gas through an inner port 27 which at that time is an outlet port discharging through port 16 to the measured gas chamber. At the same time the gas enters chamber $g$ through inner ports 30, 27 and 16' and forces gas out of the outer chamber $f'$ through the outer port 32'. In this way the weights formed by the plates are shifted toward the left side of the drum and the center of gravity is shifted to the left of the axle of spindle 21, and therefore the drum rotates in the direction of the feathered arrow passing the dot and dash position and approaching the position shown in Fig. 7. By this movement ports are uncovered so as to admit gas to the chamber $e'$ and to supply gas to the chamber $d$ as indicated in Fig. 7.

The inflation and deflation are thus continued and the drum continues to respond to the change of center of gravity of the drum structure.

Said center of gravity may at some portions of the operation come into the vertical plane of the axis of the drum, and at such a time the drum may stand still, but the ports are so arranged that at such time the ports are opened to allow flow of gas through the ports that are in horizontal alinement, so that the horizontally-alined chambers $f$, $f'$, $g$, $g'$ will be active until the diaphragm plates have been shifted sufficiently to again revolve the drum.

The spindle 21 is inserted through the hub and is of sufficient length to extend through the channel spindle bearing 22 on one side of the drum, and into the spindle bearing 7 on the other side of the drum. A finger 50 fixed to the spindle rotates with the drum to actuate the propelling mechanism 51 of the registering mechanism 52. The gravity-operated detent 53 pivoted at 54 to the standard 6 and limited in movement by the stops 58, 59 prevents any possibility of operating the meter a full turn backward.

The non-rotating valve member 13 is constructed with broad, port-closing segments 60 for fully covering two pairs of ports 26, 27 at a determined position of the drum, and the median line $w$ of the port-closing segments 60 is normal to a median line $v$ through the ports 15', 16 on the one side and 15, 16' on the other side of the center of the non-rotative valve member. The median line of said two pairs of ports is preferably arranged at an angle of about 20° with the horizon.

In practical operation there is alawys an open passage from the supply chamber into at least two measuring chambers of the drum and a corresponding open passage from the measuring chambers of the drum which are diametrically alined therewith.

It is a fact in operation that the open inlet and outlet ports are always absolutely equivalent. The inlet and outlet ports opposite the axis of rotation are absolutely equivalent, and the volume of gas coming in is absolutely equal to the volume of gas going out.

The valve arrangement is such that the opening of the inlet port of a receiving measuring chamber and the outlet port to its complementary chamber occurs simultaneously when a diameter through the axis of the drum and through the center of said complementary chambers is at an angle to the horizon of about twenty degrees.

An oil chamber 61 and wick means 62 leading from the oil chamber to the outlet from the unmeasured gas inlet chamber, are provided to conduct a limited supply of lubricating oil into the course of the on-flowing gas for the purpose of lubricating the diaphragm membranes.

A plate 63 is placed inside of the wall 40 in opposition to the diaphragm plates 38 of each outer chamber, a screw-threaded stud 64 fixed at the center of the plate 63 is screwed outwardly through the wall 40, there being a screw driver kerf 65 in the outer end of the stud, and a jam nut 66 is mounted upon the outer end of the stud, against the wall so that the plate 63 forms an adjustable stop to limit the deflation of the chamber, and by manipulating these stops the aggregate volume of gas discharged to an action may be varied. The adjustment is made by loosening the jam nut 66, operating the stud to screw it in or out to the desired extent, then tightening the jam nut. It is understood, however, that in common practice the parts may be so accurately constructed that the regulator stop may be omitted.

In this present meter each diaphragm acts independently of the others, gas being admitted and expelled on both sides, alternately forcing the diaphragm out, expelling gas above it, and back, expelling gas below. This is the result of the novel construction in which each diaphragm has a pan or measure on each of its two opposite sides. Each pan or diaphragm now acts independently of the others. This, as must be seen, allows the diaphragm to shift its weight horizontally, or downward, but never directly upward, to express the gas; and therefore the pressure to operate the machine is minimized, while at the same time the capacity or amount of gas for each revolution is doubled. Still another, more important if possible, advantage of this double pan, is the fact that it makes an exact measure in cubic inches of gas passing at each revolution. It is a metallic measure, unchangeable. The diaphragms fill the pans or measures, first one side then the other, completely emptying each, each revolution of the drum. This does away with regulating the meter, a necessity heretofore existing, to correct running fast or slow after usage for a time. When the meter is once correct it remains correct until the diaphragms fail. This is regarded as a very important and most valuable fact in the service, saving great expense heretofore involved in repairs and readjustment, and in loss of gas either to the manufacturer or to the consumer, according to whether the meter of the old type were to run fast or slow.

I claim:—

1. A gas meter drum having a double acting diaphragm adapted to revolve with the drum and means on opposite sides of the diaphragm to coöperate therewith to constitute two measuring chambers.

2. A gas meter drum having a double acting diaphragm adapted to revolve with the drum and ported pans on opposite sides of the diaphragm to coöperate therewith to constitute two measuring chambers.

3. A gas meter drum having a double acting diaphragm adapted to revolve with the drum and pressed sheet-metal ported pans on opposite sides of the diaphragm to coöperate therewith to constitute two measuring chambers.

4. A gas meter drum having a double acting weighted diaphragm adapted to revolve with the drum and means on opposite sides of the diaphragm to coöperate therewith to constitute two measuring chambers.

5. A gas meter drum having a double acting weighted diaphragm adapted to revolve with the drum and ported pans on opposite sides of the diaphragm to coöperate therewith to constitute two measuring chambers.

6. A gas meter drum having a double acting weighted diaphragm adapted to revolve with the drum and pressed sheet-metal ported pans on opposite sides of the diaphragm to coöperate therewith to constitute two measuring chambers.

7. In a gas meter drum a double acting diaphragm adapted to revolve with the drum; ported pans on opposite sides of the diaphragm and coöperating therewith to form two measuring chambers, and means for alternately filling one and emptying the other of said chambers, and vice versa.

8. In a gas meter, a drum provided with two ported pans having marginal flanges; and a diaphragm adapted to revolve with the drum, the diaphragm having its margins clamped between said marginal flanges and being adapted to oscillate for inflation of one of said pans and deflation of the other, and vice versa.

9. In a rotary gas meter, two ported pans having marginal flanges; a centrally weighted diaphragm having its margins clamped between said marginal flanges and being adapted to oscillate for inflation of one of said pans and deflation of the other, and vice versa, and means to allow said pans to turn on an axis responsive to the movement of the weight from the axis.

10. In a gas meter a drum having a ported hub provided on diametrically opposite sides of its axis with pairs of ports, there being an outer and inner port in each pair; ported outer and inner chambers connected to the hub, there being an outer chamber for each of said outer ports and an inner chamber for each of said inner ports; diaphragms between said inner and outer chambers of each pair respectively, said diaphragms being adapted to oscillate for the inflation and deflation of the chambers respectively; and means for alternately supplying gas to one and the other of said ports and vice versa; said hub being adapted to rotate on an axis.

11. In a gas meter a drum having a ported hub provided on diametrically opposite sides of its axis with pairs of ports, there being an outer and inner port in each pair; ported outer and inner chambers connected to the hub, there being an outer chamber for each of said outer ports and an inner chamber for each of said inner ports; diaphragms between said inner and outer chambers of each pair respectively, said diaphragms being adapted to oscillate for the inflation and deflation of the chambers respectively; means for alternately supplying gas to one and the other of said ports and vice versa; said hub being adapted to rotate on an axis, and central weights on said diaphragms.

12. A rotary gas meter drum provided with diametrically opposite pairs of ported measuring chambers adapted to rotate with the drum, and diametrically-opposite double acting diaphragms between said chambers for the inflation and deflation thereof; a case surrounding said drum connected to a source of supply; and means to alternately connect ports of said chambers with the gas supply and with the case for alternate inflation and deflation of diametrically-opposite chambers.

13. A gas meter drum comprising pairs of outer and inner pans and provided with ports for said pans respectively; diaphragm means separating the inner and outer pans of each pair so that the pans and diaphragms of each pair constitute two measuring chambers, the inflation of one chamber effecting the deflation of the other chamber and vice versa, by movement of the diaphragm from pan to pan.

14. A gas meter drum comprising outer and inner pans arranged in pairs, each pan being provided with a port, a diaphragm between the inner and outer pan of each pair respectively, said diaphragm being provided with a centrally-arranged weight and said diaphragm and weight being adapted to oscillate from pan to pan for inflation and deflation of said pans alternately and to change the center of gravity to rotate the drum.

15. A gas meter comprising a drum provided with oppositely-arranged pairs of inner and outer pans provided respectively with ports, weighted diaphragms between the pans of each pair, means to alternately connect the inner port of one pair and the outer port of its opposite pair with the gas inlet and to connect the complementary outer and inner ports of said pairs with the gas outlet.

16. A gas meter comprising a drum provided with oppositely-arranged pairs of inner and outer pans provided respectively with ports, weighted diaphragms between the pans of the respective pairs, means to alternately connect the inner port of one pair and the outer port of its opposite pair with the gas inlet and to connect the complementary outer and inner ports of said pairs with the gas outlet, so that the oppositely-arranged diaphragms will move simultaneously in the same direction to simultaneously inflate the complementary inner and outer pans and to deflate complementary outer and inner pans.

17. A gas meter comprising a revoluble measuring drum, a gas holder surrounding said drum, measuring means within the drum and means to cause gas to pass through the measuring means and drum in a process of measurement so that during the operation of the meter the measuring drum is surrounded by measured gas to prevent condensation within the drum.

18. The combination with a rotary measuring drum having pairs of outer and inner measuring chambers separated by diaphragms, of valve mechanism having a stationary valve member provided with inlet ports and with outlet ports; a rotary valve member connected to and rotating with the drum and provided with inner and outer ports for the measuring chambers on opposite sides of the diaphragms respectively, there being an inlet port and an outlet port on opposite sides of the produced axis of the drum between the oppositely-arranged cut-offs between the sets of inlet and outlet ports, so that at the rotation of the drum oppositely-arranged sets of inlet and outlet ports may be cut off while two other sets of inlet and outlet ports will be opened thereby allowing inflation of two measuring chambers and deflation of two other measuring chambers to occur while the intermediate sets of inner and outer chambers are cut off.

19. In a gas meter a drum comprising a ported hub member having a central axis, diametrically opposite pans fastened to said hub member and provided with ports communicating with ports of the hub, diaphragms fastened to the rims of said pans, outer pans applied to said diaphragms and fastened to the rims of the inner pans and provided with ports, a valve mechanism for admitting gas to an outer pan on one side of the axis and an inner pan on the other side of the axis, and also connecting an outer pan on one side with an outlet and an inner pan on the other side with an outlet so that two pans may be deflated at the same time that two other pans are being inflated.

20. A gas meter provided with a ported measuring pan; a diaphragm operable in said measuring pan to deflate the same; and an adjustable stop for said diaphragm to regulate the deflating action thereof.

21. The combination with an unmeasured gas chamber and means to supply gas thereto; of outlet means for said unmeasured gas chamber; a gas meter drum having measuring chambers and provided with diaphragm membrances; means for the inflation and deflation of the measuring chamber; an oil chamber; and wick means leading from the oil chamber to said outlet means therefrom, to conduct a limited supply of lubricating oil into the course of the onflowing gas for the purpose of lubricating the diaphragm membranes.

22. A meter provided with a rotary drum having independently-acting, circumferentially-disposed weighted diaphragms, the rotation of the drum being controlled by the shifting of said weighted diaphragms, the drum having pans on opposite sides of each diaphragm, and means to admit and emit gas from the pans in response to the rotation of the drum.

In testimony whereof, I have hereunto set my hand at Los Angeles, California, this 23d day of May, 1916.

ELIAS B. DE LA MATYR.

Witness:
JAMES R. TOWNSEND.

Copies of this patent may be obtained for five cents each, by addressing the "Commissioner of Patents. Washington, D. C."